(12) United States Patent
Cardarella, Jr.

(10) Patent No.: US 8,191,254 B2
(45) Date of Patent: Jun. 5, 2012

(54) METHOD AND APPARATUS FOR IMPROVING FAN CASE CONTAINMENT AND HEAT RESISTANCE IN A GAS TURBINE JET ENGINE

(75) Inventor: Louis James Cardarella, Jr., Newport Coast, CA (US)

(73) Assignee: Carlton Forge Works, Paramount, CA (US)

( * ) Notice: Subject to any disclaimer, the term of this patent is extended or adjusted under 35 U.S.C. 154(b) by 505 days.

(21) Appl. No.: 10/947,923

(22) Filed: Sep. 23, 2004

(65) Prior Publication Data
US 2006/0059889 A1 Mar. 23, 2006

(51) Int. Cl.
*F01D 21/00* (2006.01)
*F02K 3/04* (2006.01)

(52) U.S. Cl. .................................................. 29/889.2

(58) Field of Classification Search .............. 29/889.21, 29/889.22, 889.2; 415/9, 196, 197, 200, 415/174.4, 170.1; 60/226.1, 223
See application file for complete search history.

(56) References Cited

U.S. PATENT DOCUMENTS

| | | | |
|---|---|---|---|
| 3,085,398 A | 4/1963 | Ingleson | |
| 3,241,813 A | 3/1966 | Von Flue et al. | |
| 3,719,365 A | 3/1973 | Emmerson et al. | |
| 3,798,899 A | 3/1974 | Hill | |
| 3,854,843 A | 12/1974 | Penny | |
| 3,859,008 A | 1/1975 | Wieser | |
| 3,888,602 A | 6/1975 | Nichols et al. | |
| 3,928,963 A * | 12/1975 | Devers et al. .................. | 415/9 |
| 3,986,790 A | 10/1976 | Yamaguchi et al. | |
| 4,101,242 A | 7/1978 | Coplin et al. | |
| 4,354,687 A | 10/1982 | Holland et al. | |
| 4,417,848 A * | 11/1983 | Dembeck .................. | 415/121.2 |
| 4,452,563 A | 6/1984 | Belanger et al. | |
| 4,484,856 A | 11/1984 | Patacca | |
| 4,513,567 A | 4/1985 | Deveau et al. | |
| 4,648,795 A | 3/1987 | Lardellier | |

(Continued)

FOREIGN PATENT DOCUMENTS
CN 1542259 11/2004
(Continued)

OTHER PUBLICATIONS

PCT International Search Report and Written Opinion, Apr. 13, 2006, for International Application No. PCT/US2005/016901.

(Continued)

*Primary Examiner* — Ted Kim
(74) *Attorney, Agent, or Firm* — Konrad Raynes & Victor LLP

(57) ABSTRACT

A method and apparatus for improving fan case containment in a gas turbine jet engine employs a containment ring and a heat resistance ring which are shrink interference fit on the inside diameter of the fan case, the containment ring where the large fan blades turn, and the heat resistance ring where heated air from backfiring heats up the fan case. The containment ring is made of a super alloy to provide added strength to the fan case should a fan blade break, containing the fan blade within the fan case. The heat resistance ring is made of titanium or other suitable material. Additionally, one or more stiffener rings are shrink interference fit on the outside diameter of the fan case. The containment ring and stiffener rings can reduce the flight weight of the fan case and lower the material costs, while increasing the containment strength of the fan case.

14 Claims, 6 Drawing Sheets

U.S. PATENT DOCUMENTS

| | | | | |
|---|---|---|---|---|
| 4,734,007 A * | 3/1988 | Perry | | 415/9 |
| 4,878,821 A | 11/1989 | Huether et al. | | |
| 4,934,899 A | 6/1990 | Patacca | | |
| 4,940,386 A * | 7/1990 | Feuvrier et al. | | 415/209.2 |
| 5,018,942 A | 5/1991 | Ciokajlo et al. | | |
| 5,154,575 A | 10/1992 | Bonner et al. | | |
| 5,163,809 A | 11/1992 | Akgun et al. | | |
| 5,267,828 A * | 12/1993 | Lenhart et al. | | 415/9 |
| 5,288,206 A | 2/1994 | Bromann et al. | | |
| 5,332,358 A | 7/1994 | Hemmelgarn et al. | | |
| 5,336,044 A * | 8/1994 | Forrester | | 415/9 |
| 5,403,148 A * | 4/1995 | Forrester | | 415/9 |
| 5,724,816 A * | 3/1998 | Ritter et al. | | 60/752 |
| 5,823,739 A | 10/1998 | Van Duyn | | |
| 6,053,696 A | 4/2000 | Roberts | | |
| 6,149,380 A * | 11/2000 | Kuzniar et al. | | 415/9 |
| 6,290,455 B1 * | 9/2001 | Hemmelgarn et al. | | 415/9 |
| 6,368,054 B1 | 4/2002 | Lucas | | |
| 6,382,905 B1 * | 5/2002 | Czachor et al. | | 415/9 |
| 6,394,746 B1 | 5/2002 | Sathianathan et al. | | |
| 6,487,491 B1 | 11/2002 | Karpman et al. | | |
| 6,494,675 B2 * | 12/2002 | Pesek et al. | | 415/174.4 |
| 6,497,550 B2 * | 12/2002 | Booth | | 415/9 |
| 6,514,041 B1 | 2/2003 | Matheny et al. | | |
| 6,619,909 B2 | 9/2003 | Barnett et al. | | |
| 6,637,186 B1 * | 10/2003 | Van Duyn | | 60/223 |
| 6,719,242 B2 | 4/2004 | Floyd, Jr. et al. | | |
| 6,848,885 B1 | 2/2005 | Maclean | | |
| 6,896,483 B2 | 5/2005 | Dierksmeier et al. | | |
| 7,255,528 B2 | 8/2007 | Stretton | | |
| 2001/0028840 A1 | 10/2001 | Booth | | |
| 2004/0219011 A1 | 11/2004 | Albers et al. | | |
| 2005/0042090 A1 | 2/2005 | Maclean | | |
| 2005/0252000 A1 | 11/2005 | Cardarella, Jr. et al. | | |
| 2005/0254950 A1 | 11/2005 | Mons | | |
| 2006/0013681 A1 | 1/2006 | Cardarella | | |

FOREIGN PATENT DOCUMENTS

| | | |
|---|---|---|
| DE | 2524556 | 12/1975 |
| EP | 1087105 | 3/2001 |
| EP | 1 475 516 | 11/2004 |
| EP | 1197570 | 12/2004 |
| EP | 1 508 673 | 2/2005 |
| EP | 1406019 | 11/2005 |
| FR | 2574476 | 6/1986 |
| GB | 1509492 | 5/1978 |
| GB | 2192238 | 1/1988 |
| JP | 2004332731 | 11/2004 |
| RU | 2171382 | 7/2001 |
| RU | 2232276 | 7/2004 |
| RU | 2398135 | 8/2010 |
| SU | 926369 | 5/1982 |
| SU | 1590683 | 9/1990 |
| SU | 1638371 | 3/1991 |
| SU | 1758292 | 8/1992 |
| WO | 2006046969 | 5/2006 |
| WO | 2006137875 | 12/2006 |
| WO | 2007035184 | 3/2007 |

OTHER PUBLICATIONS

Declaration by inventor L. James Cardarella, Jr.; Jul. 26, 2005; 2 pp.
"Shaft and Housing Fits," Engineering Data Nov. 1979, 140-110, Bearings Group SKF Industries, Inc.; pp. 82-87 with cover page.
PK 10012005 OA.
PK 8772005 OA.
PCT US2005033564 Search Report dated Apr. 3, 2007.
U.S. Appl. No. 11/129,627 Declaration by Inventor.
Abstract for CN1542259, Nov. 3, 2004, 1 pp.
Examination Report, Mar. 6, 2008, for EP05849434.5-2315, 3 pp.
Examination Report, received Feb. 12, 2008, for SA05260324, 3 pp.
International Preliminary Report on Patentability (IPRP), Nov. 30, 2006, for PCT/US2005/016901, 8 pp.
International Preliminary Report on Patentability (IPRP), Jul. 26, 2007, for PCT/US2005/033564, 11 pp.
International Preliminary Report on Patentability (IPRP), Apr. 3, 2008, for PCT/US2005/041822, 12 pp.
International Search Report and Written Opinion, Jun. 29, 2007, for PCT/US2005/033564, 19 pp.
Office Action 1, received on Jan. 29, 2008, for CN2005800157454, 10 pp.
Email from Boult Wade Tennant, dated Apr. 30, 2009, summarizing the objections in the Second Official Letter issued in Application EG PCT 309/2007, 3 pp.
Examination Report, Jun. 19, 2009, for Application No. MY PI20054393, 8 pp.
Examination Report, May 12, 2009, for Application No. NZ554496, 2 pp.
Final Office Action 1, Jan. 9, 2009, for U.S. Appl. No. 11/129,627, 18 pp.
Office Action 1, Jun. 5, 2009, Application No. CN2005800157454, 10 pp.
Office Action 1, May 2, 2008, for U.S. Appl. No. 11/129,627, 22 pp.
Office Action 3, Aug. 17, 2009, for U.S. Appl. No. 11/129,627, 20 pp.
Final Office Action 2, Dated Apr. 15, 2010, for U.S. Appl. No. 11/129,627, 18 pp.
Abstract for Publication No. RU2171382, dated Aug. 27, 2001, 1 pg.
Abstract for Publication No. RU2232276, dated Jul. 10, 2004, 1 pg.
Abstract for Publication No. SU926369, dated May 7, 1982, 1 pg.
Abstract for Publication No. SU1590683, dated Sep. 7, 1990, 1 pg.
Abstract for Publication No. SU1638371, dated Mar. 30, 1991, 1 pg.
Abstract for Publication No. SU1758292, dated Oct. 30, 1992, 1 pg.
Decision on Grant for Application No. RU2007115081, received Mar. 10, 2010, 11 pp. [English Translation].
Abstract for JP Publication No. 2004332731, dated Nov. 25, 2004, 1 pg.
Abstract for RU Publication No. 2398135, dated Aug. 27, 2010, 1 pg.
Final Office Action 2 for U.S. Appl. No. 11/129,627, dated Apr. 15, 2010, 18 pp.
Search Report and Written Opinion for SG Application No. 070220-5, Apr. 27, 2009, 14 pp.
Communication under Rule 71(3) EPC (NOA1) for EP Application No. 05849434.5, Jul. 6, 2010, 35 pp.
Decision on Grant (NOA1) for RU Application No. 2007115081, received Mar. 10, 2010, 11 pp.
Decision on Grant (NOA1) for RU Application No. 2007115082, dated Apr. 6, 2010, 9 pp.
Email regarding Notice of Allowance (NOA1) for SA Application No. 05260302, dated Jul. 19, 2010, 2 pp.
Notification of the First Office Action (OA1) for CN Application No. 2005800319891, dated Jun. 5, 2009, 6 pp.
Email regarding Office Action 1 (OA1) for EG Application No. PCT 1092/2006, dated Nov. 2, 2008, 2 pp.
Email regarding Office Action 1 (OA1) for ID Application No. W00200603257, dated Apr. 24, 2009, 3 pp.
Email regarding Office Action 1 (OA1) for ID Application No. W00200700972, dated Jan. 11, 2010, 2 pp.
Email regarding Office Action 1 (OA1) for ID Application No. W00200700975, dated Nov. 12, 2009, 2 pp.
Notice of Deficiencies (OA1) for IL Application No. 181844, dated Jan. 31, 2010, 1 pp.
Office Action 1 (OA1) for IL Application No. 181845, dated Jan. 31, 2010, 1 pp.
Notice of Reason(s) for Refusal (OA1) for JP Application No. 2007-527324, dated Oct. 5, 2010, 3 pp.
Email regarding Official Letter (OA1) for MX Application No. 2006013304, dated Feb. 27, 2009, 5 pp.
Examination Report 1 (OA1) for NZ Application No. 551475, dated Mar. 26, 2009, 2 pp.
Examination Report 1 (OA1) for NZ Application No. 554500, dated Nov. 16, 2009, 2 pp.
Official Action 1 (OA1) for RU Application No. 2006144869, received Mar. 31, 2009, 4 pp.
Office Action 1 (OA1) for RU Application No. 2007115081, received Feb. 6, 2009, 2 pp.
Official Action 1 (OA1) for RU Application No. 2007115082, received May 26, 2009, 1 pg.
First Substantive Examination Report (OA1) for SA Application No. 05260302, received Nov. 11, 2009, 2 pp.

Email regarding Examination Report 1 (OA1) for SG Application No. 200702220-5, received Apr. 16, 2010, 2 pp.
Official Action 1 (OA1) for UA Application No. 200613303, received Apr. 26, 2010, 4 pp.
Official Action 1 (OA1) for UA Application No. 200704355, received Apr. 16, 2010, 5 pp.
Official Action 1 (OA1) for UA Application No. 200704360, received Dec. 22, 2009, 1 pp.
The Second Office Action (OA2) for CN Application No. 2005800157454, dated Mar. 23, 2010, 3 pp.
Examination Report 2 (OA2) for NZ Application No. 551475, dated Jun. 21, 2010, 1 pg.
Examination Report 2 (OA2) for PK Application No. 10012005, received Oct. 27, 2009, 1 pg.
Office Action 2 (OA2) for RU Application No. 2006144869, received Apr. 9, 2010, 16 pp. [OA in Russian, Claims Proposed by Examiner in English].
Second Substantive Examination Report (OA2) for SA Application No. 05260324, received Jun. 11, 2009, 1 pg.
Second Substantive Examination Report (OA2) for SA Application No. 05260302, received Mar. 8, 2010, 1 pp.
Examination Report 3 (OA3) for NZ Application No. 551475, Aug. 6, 2010, 2 pp.
Office Action 5 (OA5) for U.S. Appl. No. 11/129,627, Nov. 24, 2010, 17 pp.
Response to Office Action 1 (ROA1) for EP Application No. 05849434.5, dated Sep. 2, 2008, 17 pp.
Email regarding Response to Office Action 1 (ROA1) for ID Application No. W00200700975, received Apr. 14, 2010, 11 pp.
Memorandum in Response to Official Action of Jan. 31, 2010 (ROA1) for IL Application No. 181844, Mar. 1, 2010.
Response to Office Action 1 (ROA1) for NZ Application No. 551475, May 25, 2010, 44 pp.
Response to Office Action 1 (ROA1) for PK Application No. 1001/2005, Jun. 18, 2008, 3 pp.
Response to Further Examination Report (ROA2) for NZ Application No. 551475, Jul. 20, 2010, 1 pp.
Response to Office Action 1 (ROA1) for ID Application No. W00200700972, received Jun. 23, 2010, 12 pp.
PK 10012005 OA recd Oct. 5, 2007.
PK 8772005 OA recd Aug. 13, 2007.
PCT US2005041822 Search Report dated Jun. 11, 2007.
PCT US2005033564 Search Report dated Apr. 4, 2007.
US11129627 Declaration by Inventor, dated Aug. 5, 2005 in 1129627.
GE Aircraft Engines, "Jet Engines and Propulsion Systems for Engineers", Part 1 of 5, © 1989, 104 pp.
GE Aircraft Engines, "Jet Engines and Propulsion Systems for Engineers", Part 2 of 5, © 1989, 104 pp.
GE Aircraft Engines, "Jet Engines and Propulsion Systems for Engineers", Part 3 of 5, © 1989, 104 pp.
GE Aircraft Engines, "Jet Engines and Propulsion Systems for Engineers", Part 4 of 5, © 1989, 104 pp.
GE Aircraft Engines, "Jet Engines and Propulsion Systems for Engineers", Part 5 of 5, © 1989, 100 pp.
Lattime, S.B. and B.M. Steinetz, "Turbine Engine Clearance Control Systems: Current Practices and Future Directions", Sep. 2002, 22 pp.
Decision on Grant for RU Application No. 2006144869, received Dec. 17, 2010, 30 pp.
Decision on Grant for UA Application No. 2006133303, received Apr. 21, 2011, 10 pp. (NOA1).
Examination Report for AU Application No. 2005333173, dated Sep. 2, 2010, 2 pp. (OA1).
Examination Report for SG Application No. 0702220-5, dated Mar. 15, 2010, 7 pp. (OA1).
Office Action 1 and Search Report for TW Application No. 94132508, dated Dec. 9, 2010, 24 pp. (OA1).
Office Action 2 for IL Application No. 181844, dated Aug. 22, 2010, 7 pp. (OA2).
Official Action 2 for UA Application No. 200704360, received Nov. 24, 2010, 8 pp. (OA2).
Response to Examination Report 1 for NZ Application No. 554500, dated Apr. 18, 2011, dated Apr. 18, 2011, 52 pp. (ROA1).
Office Action 1 for U.S. Appl. No. 11/575,858, dated Dec. 19, 2011, 10 pp. (OA1).
Email regarding Office Action 1 for EG Application No. PCT 1493/2007, dated Jul. 21, 2011, 2 pp. (OA1).
Email regarding Office Action 1 for EG Application No. PCT 1494/2007, dated Jun. 21, 2011, 2 pp. (OA1).
Email regarding Office Action 1 for EG Application No. PCT 1495/2007, dated Jul. 21, 2011, 2 pp. (OA1).
Email regarding Office Action 2 for MX Application No. 2007/003445, dated Jun. 21, 2011, 2 pp. (OA2)
Email regarding Rejection Decision for EG Application No. PCT 308/2007, dated Jun. 8, 2010, 2 pp. (RejDec).
Email regarding Rejection Decision for EG Application No. PCT 309/2007, dated May 4, 2010, 2 pp. (RejDec).
Final Office Action 3 for U.S. Appl. No. 11/129,627, dated Jul. 25, 2011, 14 pp. (FOA3).
Examination Report and Notice of Acceptance of Complete Specification for NZ Application No. 554500, dated May 6, 2011, 1 pg. (NOA1).
Office Action 1 and Search Report for TW Application No. 094136233, dated May 20, 2011, 35 pp. (with English Translation of Search Report). (OA1 & SrchRpt).
Office Action 1 for AU Application No. 2005300065, dated Jun. 28, 2010, 2 pp. (OA1).
Office Action 1 for AU Application No. 2005335919, dated May 24, 2011, 4 pp. (OA1).
Notice of Reason(s) for Refusal for JP Application No. 2007-533580, dated May 10, 2011, 4 pp.(with English Translation). (OA1).
Notification of Reason(s) for Refusal for JP Application No. 2008-531073, dated Jul. 5, 2011, 6 pp. (with English Translation). (OA1).
Examination Report for MX Application No. 2007003445, dated Oct. 1, 2010, 5 pp. (with English Translation). (OA1).
Office Action 2 for CN Application No. 2005800319891, dated Jun. 24, 2011, 11 pp. (with English Translation). (OA2).
Response to Final Office Action 1 for U.S. Appl. No. 11/129,627, dated Jul. 9, 2009, 26 pp. (RFOA1).
Response to Final Office Action 2 for U.S. Appl. No. 11/129,627, dated Oct. 15, 2010, 17 pp. (RFOA2).
Response to Office Action 1 for U.S. Appl. No. 11/129,627, dated Sep. 2, 2008, 24 pp. (ROA1).
Response to Office Action 3 for U.S. Appl. No. 11/129,627, dated Jan. 18, 2010, 26 pp. (ROA3).
Response to Office Action 5 for U.S. Appl. No. 11/129,627, dated Apr. 25, 2011, 18 pp. (ROA5).

* cited by examiner

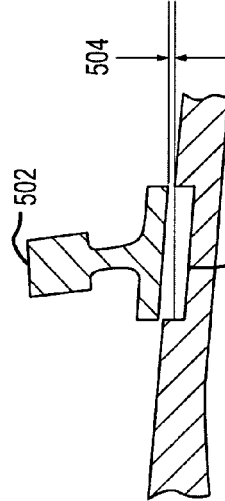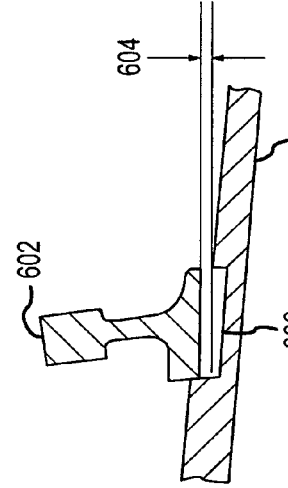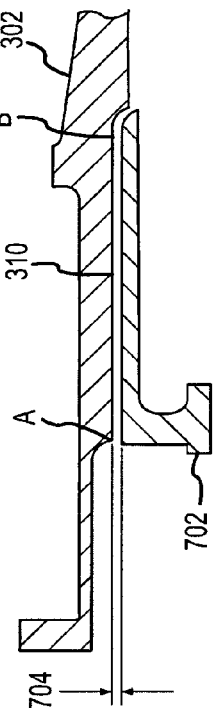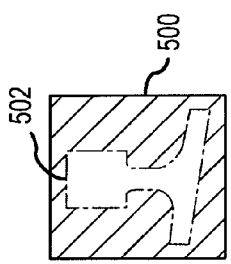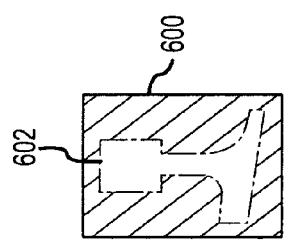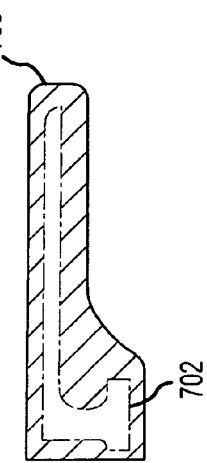

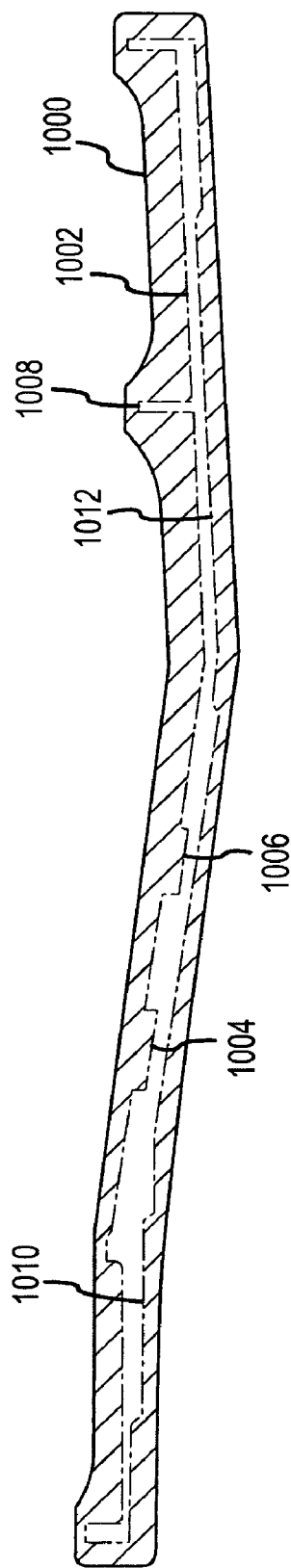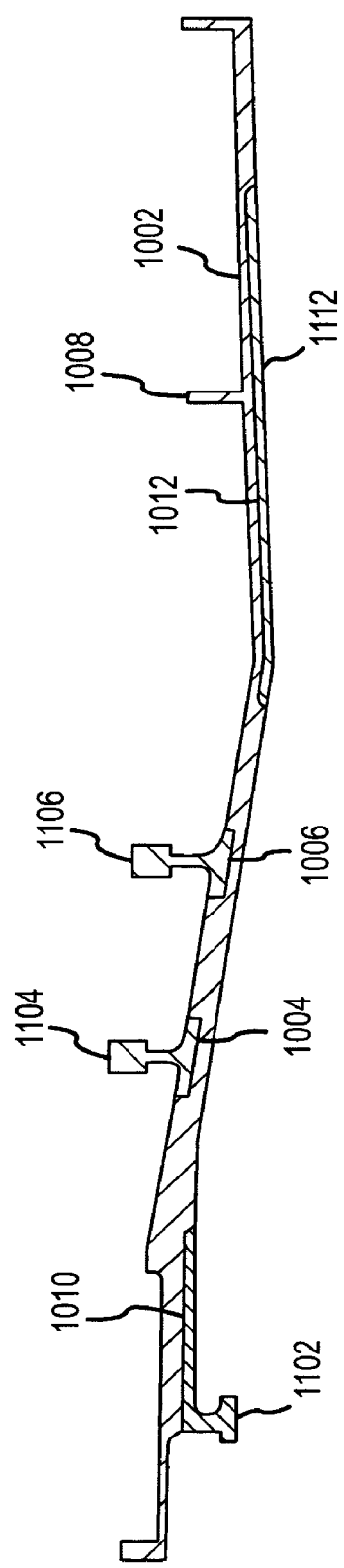

METHOD AND APPARATUS FOR IMPROVING FAN CASE CONTAINMENT AND HEAT RESISTANCE IN A GAS TURBINE JET ENGINE

FIELD OF THE INVENTION

This invention relates to gas turbine jet engines, and more particularly to fan case containment of gas turbine jet engines, and even more particularly to a method and apparatus for improving fan case containment and heat resistance.

BACKGROUND OF THE INVENTION

In a full test of a gas turbine jet engine, a fan blade is deliberately released from the hub at a maximum engine rotation speed by an explosive bolt positioned at the base of the fan blade. This test is used to demonstrate the engine carcass's ability to contain the impact of the fan blade and handle the resulting out-of-balance forces. This impact is absorbed as vibration through the fan case containment system which surrounds the engine. The fan case is the key element in fan case containment and is typically the heaviest component of a gas turbine jet engine due to its size, and due to the strength requirements the fan case must possess for containment purposes. In gas turbine jet engines susceptible to backfiring, heated air travels backward from the combustor to the fan area, increasing the temperature within the fan case and causing a rise in fan case temperature. These higher temperatures may be a factor in determining what material the fan case must be constructed. Maintaining or reducing the weight of the fan case, while at the same time maintaining or improving fan case containment strength and utilizing fan case materials that can withstand the fan case temperatures is a demonstrated need in the art.

BRIEF DESCRIPTION OF THE DRAWINGS

FIG. 5A shows a cross section of a forging for a first stiffener ring for the fan casing of FIG. 3 in an embodiment of the present invention.

FIG. 5B shows the first stiffener ring of FIG. 5A about to be shrink interference fit to the fan casing of FIG. 3 in an embodiment of the present invention.

FIG. 6A shows a cross section of a forging for a second stiffener ring for the fan casing of FIG. 3 in an embodiment of the present invention.

FIG. 6B shows the second stiffener ring of FIG. 6A about to be shrink interference fit to the fan casing of FIG. 3 in an embodiment of the present invention.

FIG. 7A shows a cross section of a forging for a containment ring for the fan casing of FIG. 3 in an embodiment of the present invention.

FIG. 7B shows the containment ring of FIG. 7A about to be shrink interference fit to the fan casing of FIG. 3 in an embodiment of the present invention.

FIG. 10 shows a cross section of a forging for a fan casing for improved heat resistance in an embodiment of the present invention.

FIG. 11 shows a cross section of a machine finished fan casing having a ring of heat resistant material that has been shrink interference fit to the fan casing of FIG. 10 in an embodiment of the present invention.

DETAILED DESCRIPTION OF THE INVENTION

Figure 1:
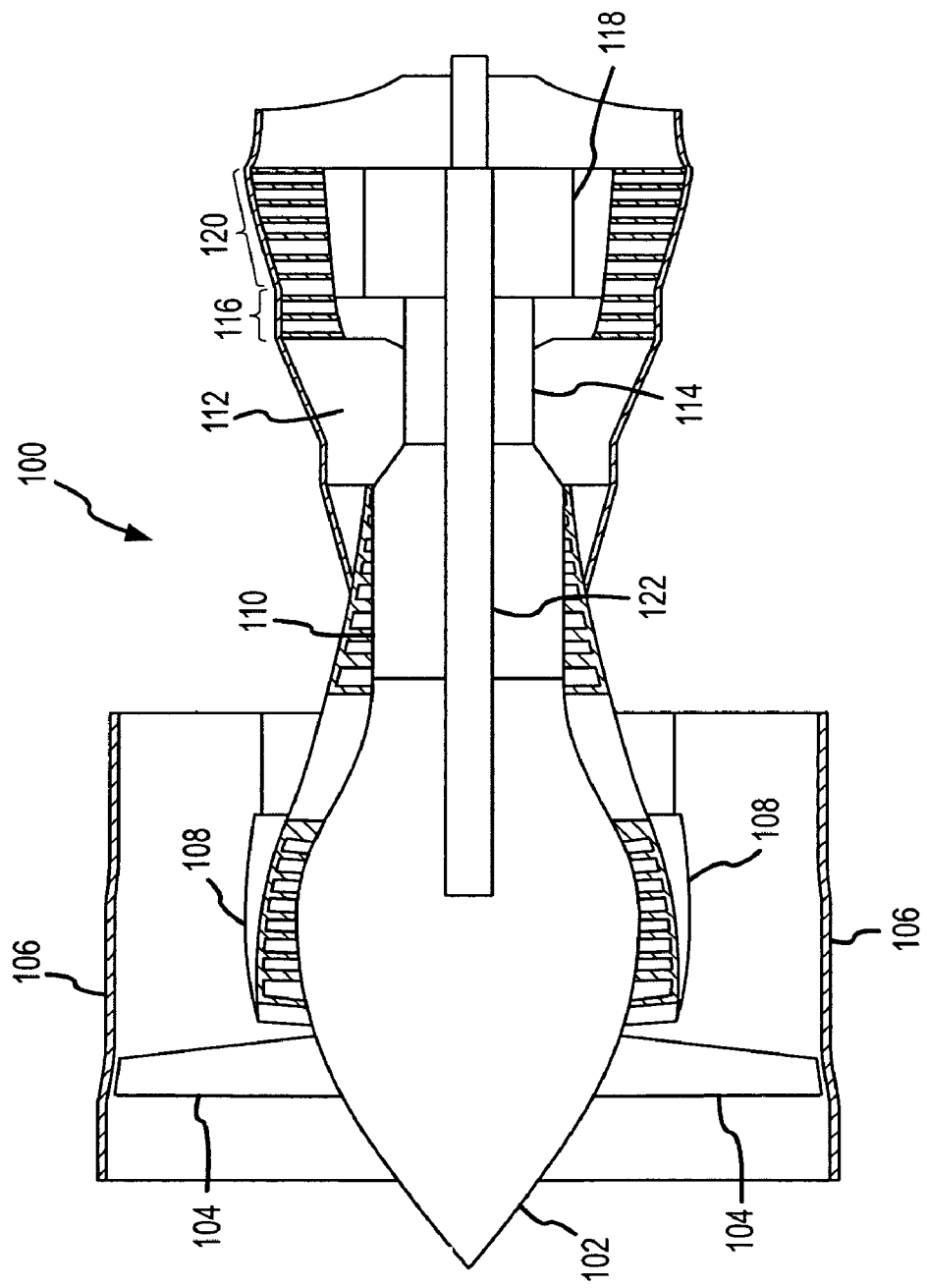
FIG. 1 shows a schematic diagram of the overall structure of a typical gas turbine jet engine with a fan casing typical of the prior art.

Referring now to the Figures, in which like reference numerals and names refer to structurally and/or functionally similar elements thereof, FIG. 1 shows a schematic diagram of the overall structure of a typical gas turbine jet engine with a fan casing typical of the prior art. Referring now to FIG. 1, Gas Turbine Jet Engine 100 has Fan 102 having a plurality of Fan Blades 104 for air intake and thrust housed within Fan Case 106. Booster 108 is a low pressure compressor which feeds inlet air to High Pressure Compressor Rotor 110 and its attached blades and stators, which force air into Combustor 112, increasing the pressure and temperature of the inlet air. High Pressure Turbine Rotor 114 and its accompanying blades and stators are housed within High Pressure Turbine Case 116. Low Pressure Turbine Rotor 118 and its accompanying blades and stators are housed within Low Pressure Turbine Case 120. Low Pressure Turbine Rotor 118 and its accompanying blades and stators extracts energy from the high-pressure, high-velocity gas flowing from Combustor 112 and transfers energy to Low Pressure Turbine Shaft 122, which in turn drives Fan 102, providing most of the thrust for Gas Turbine Jet Engine 100.

Figure 2:
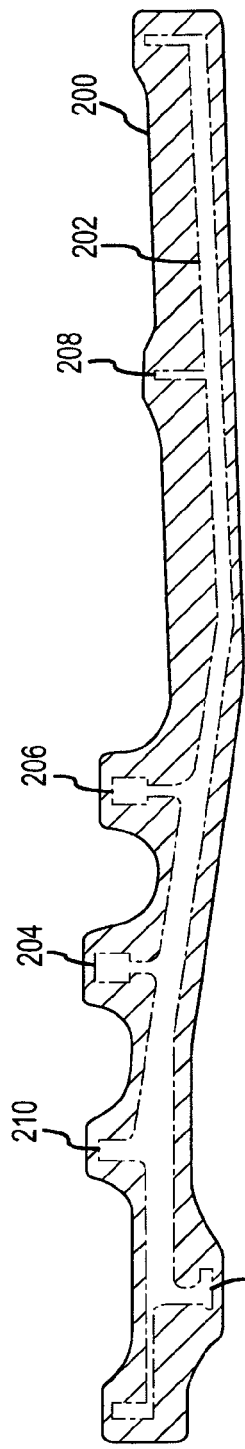
FIG. 2 shows a cross section of a forging for a fan casing typical of the prior art.

FIG. 2 shows a cross section of a forging for a fan casing typical of the prior art. Referring now to FIG. 2, Fan Case Forging 200 after machining yields Fan Case 202, shown in dotted line outline. In this example, Fan Case Forging 200 is forged from a titanium cylinder in one piece. The operating temperatures and load characteristics of the particular gas turbine jet engine that Fan Case 202 is designed for requires that Fan Case 202 be made of titanium. The forging weight for this particular Fan Case Forging 200 is approximately 3,347 pounds. After machining, Fan Case 202 has a flight weight of approximately 975.2 pounds. On gas turbine jet engines, the fan case may also be made of aluminum, steel, or manufactured from composite materials. Composite materials consist of a core material, a reinforcing material, and a resin binder. Core materials are typically wood, foam, and honeycomb. Reinforcing materials include fiberglass, carbon fiber, and Kevlar®. The resin component consists typically of polyesters, vinyl esters, and epoxies. As technology improves, and temperatures go up in the gas turbine jet engines, aluminum cases are often wrapped with Kevlar® to give added strength for fan case containment purposes. For even higher operating temperatures not appropriate for aluminum or steel, titanium is used, which may also by wrapped with Kevlar® if so needed for additional strength.

Structural features of the machined Fan Case 202 include First Stiffening Ring 204 and Second Stiffening Ring 206. These two stiffening rings help prevent Fan Case 202 from going oval under the load and temperature conditions experienced during engine operation. Accessory Flange 208 will have holes drilled through it and various engine components hung from it, such as gear boxes, tubes, wiring, etc. First Containment Ring 210 encircles the outside of Fan Case 202 and provides additional strength for fan case containment. Second Containment Ring 212 circles the inside of Fan Case 202 and also provides additional strength for fan case containment. The section of Fan Case 202 between First Containment Ring 210 and Second Containment Ring 212 is the region where a fan blade, such as Fan Blade 104 (FIG. 1) will strike should it break loose from its hub. Due to the size of the Fan Blades 104, which typically are the largest fan blades in a gas turbine jet engine, this section of Fan Case 202 must be exceptionally strong. Thus, First and Second Containment Rings 210, 212 provide the additional strength required.

Figure 3:
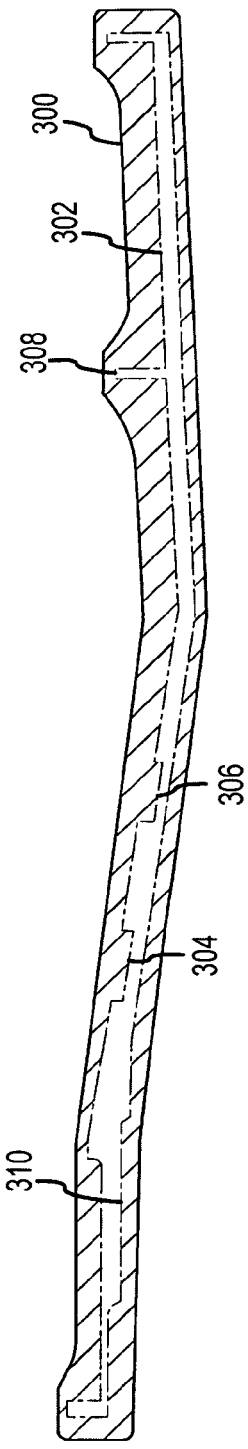
FIG. 3 shows a cross section of a forging for a fan casing for improved fan case containment in an embodiment of the present invention.

FIG. 3 shows a cross section of a forging for a fan casing in an embodiment of the present invention. Referring now to FIG. 3, a fan casing of the present invention can be substituted for Fan Case 202 for use in the same gas turbine jet engine for which Fan Case 202 was designed. Fan Case Forging 300 after machining yields Fan Case 302, shown in dotted line outline. In this example, Fan Case Forging 300 is also forged from a titanium cylinder in one piece, but is of a simpler shape which simplifies the forging process. The forging weight for Fan Case Forging 300 is approximately 2,595 pounds, 752 pounds lighter than Fan Case Forging 200. After machining, Fan Case 302 has a flight weight of approximately 751.3 pounds, 223.9 pounds lighter than Fan Case 202.

Structural features of the machined Fan Case 302 include First Stiffening Ring Notch 304 and Second Stiffening Ring Notch 306 located in a middle portion of Fan Case 302. Two stiffening rings from two additional forgings (see FIGS. 5A, 5B, 6A, and 6B) will be seated in First Stiffening Ring Notch 304 and Second Stiffening Ring Notch 306 (see FIG. 4) to help prevent Fan Case 302 from going oval under the load and temperature conditions experienced during engine operation. Depending upon the design of a particular fan case, more or less stiffening ring notches may be required, and they may be located in various positions on the outer surface of the fan case. Accessory Flange 308 towards the back end of Fan Case 302 will have holes drilled through it and various engine components hung from it, such as gear boxes, tubes, wiring, etc.

Containment Ring Notch 310 circles the inside of Fan Case 302 circumferentially at the front end. A containment ring from an additional forging (see FIGS. 7A and 7B) will be seated in Containment Ring Notch 310. The section of Fan Case 302 spanning Containment Ring Notch 310 is the region where a fan blade, such as Fan Blade 104 (FIG. 1) will strike should it break loose from its hub. This section of Fan Case 302 must be exceptionally strong, and the containment ring from the additional forging, machined to a predetermined shape to match with Containment Ring Notch 310, provides the additional strength. Fan Case 302 has no structure comparable to First Containment Ring 210 which is no longer needed with Fan Case 302 of the present invention due to the additional strength provided by the containment ring.

FIG. 5A shows a cross section of a forging for a first stiffener ring for the fan casing of FIG. 3 in an embodiment of the present invention, and FIG. 5B shows the first stiffener ring of FIG. 5A about to be shrink interference fit to the fan casing of FIG. 3 in an embodiment of the present invention. Referring now to FIGS. 5A and 5B, First Stiffening Ring Forging 500, after machining to a predetermined shape to match with First Stiffening Ring Notch 304, yields First Stiffening Ring 502, shown in dotted line outline in FIG. 5A. In this example, First Stiffening Ring Forging 500 is forged from an aluminum ring in one piece. The forging weight for First Stiffening Ring Forging 500 is approximately 154 pounds. After machining, First Stiffening Ring 502 has a flight weight of approximately 41 pounds.

First Stiffening Ring 502 is shrink interference fit into First Stiffening Ring Notch 304. At ambient temperature, the inside diameter of First Stiffening Ring 502 will be slightly smaller than the outside diameter of First Stiffening Ring Notch 304. First Stiffening Ring 502 is heated, which causes First Stiffening Ring 502 to expand, increasing the inside diameter to a diameter that is greater than the outside diameter of First Stiffening Ring Notch 304, and giving rise to First Ring Clearance 504, enabling First Stiffening Ring 502 to be positioned as shown in First Stiffening Ring Notch 304. In this position, First Stiffening Ring 502 is allowed to cool, which shrinks in diameter and seats itself circumferentially into First Stiffening Ring Notch 304. At ambient temperature, due to First Stiffening Ring 502 wanting to return to its smaller inside diameter, but being prevented from doing so due to the larger outside diameter of First Stiffening Ring Notch 304, a shrink with an interference fit results, with compressive circumferential force being applied to Fan Case 302 by First Stiffening Ring 502, and tensile circumferential force is applied to First Stiffening Ring 502 by Fan Case 302.

FIG. 6A shows a cross section of a forging for a second stiffener ring for the fan casing of FIG. 3 in an embodiment of the present invention, and FIG. 6B shows the second stiffener ring of FIG. 6A about to be shrink interference fit to the fan casing of FIG. 3 in an embodiment of the present invention. Referring now to FIGS. 6A and 6B, Second Stiffening Ring Forging 600, after machining to a predetermined shape to match with Second Stiffening Ring Notch 306, yields Second Stiffening Ring 602, shown in dotted line outline in FIG. 6A. In this example, Second Stiffening Ring Forging 600 is forged from an aluminum ring in one piece. The forging weight for Second Stiffening Ring Forging 600 is approximately 148 pounds. After machining, Second Stiffening Ring 602 has a flight weight of approximately 40.6 pounds.

Second Stiffening Ring 602 is shrink interference fit into Second Stiffening Ring Notch 306. At ambient temperature, the inside diameter of Second Stiffening Ring 602 will be slightly less than the outside diameter of Second Stiffening Ring Notch 306. Second Stiffening Ring 602 is heated, which causes Second Stiffening Ring 602 to expand, increasing the inside diameter to a diameter that is greater than the outside diameter of Second Stiffening Ring Notch 306, and giving rise to Second Ring Clearance 604, enabling Second Stiffening Ring 602 to be positioned as shown in Second Stiffening Ring Notch 306. In this position, Second Stiffening Ring 602 is allowed to cool, which shrinks in diameter and seats itself circumferentially into Second Stiffening Ring Notch 306. At ambient temperature, due to Second Stiffening Ring 602 wanting to return to its smaller inside diameter, but being prevented from doing so due to the larger outside diameter of Second Stiffening Ring Notch 306, a shrink with an interference fit results, with compressive circumferential force being applied to Fan Case 302 by Second Stiffening Ring 602, and tensile circumferential force is applied to Second Stiffening Ring 602 by Fan Case 302.

FIG. 7A shows a cross section of a forging for a containment ring for the fan casing of FIG. 3 in an embodiment of the present invention, and FIG. 7B shows the containment ring of FIG. 7A about to be shrink interference fit to the fan casing of FIG. 3 in an embodiment of the present invention. Referring now to FIGS. 7A and 7B, Containment Ring Forging 700, after machining to a predetermined shape to match with Containment Ring Notch 310, yields Containment Ring 702, shown in dotted line outline in FIG. 7A. In this example, Containment Ring Forging 700 is forged from a ring of nickel-base super alloy, such as Inconel 718, in one piece. The forging weight for Containment Ring Forging 700 is approximately 467 pounds. After machining to the predetermined shape, Containment Ring 702 has a flight weight of approximately 138.1 pounds.

Containment Ring 702 is shrink interference fit into Containment Ring Notch 310. At ambient air temperature the outside diameter of Containment Ring 702 will be slightly larger than the inside diameter of Containment Ring Notch 310. Fan Case 302 is heated, which causes Fan Case 302 to expand, increasing the inside diameter to a diameter that is greater than the outside diameter of Containment Ring 702, and giving rise to Containment Ring Clearance 704, enabling Containment Ring 702 to be positioned as shown in Containment Ring Notch 310. In this position, Fan Case 302 is allowed to cool, which shrinks in diameter and allows Containment Ring 702 to seat itself circumferentially into Containment Ring Notch 310. At ambient temperature, due to Fan Case 302 wanting to return to its smaller inside diameter, but being prevented from doing so due to the larger outside diameter of Containment Ring 702, a shrink with an interference fit results, with compressive circumferential force being applied to Containment Ring 702 by Fan Case 302, and tensile circumferential force is applied to Fan Case 302 by Containment Ring 702.

For a fan case manufactured from composite material, Containment Ring 702 is cooled with liquid nitrogen to reduce its outside diameter giving rise to Containment Ring Clearance 704, enabling Containment Ring 702 to be positioned as shown in Containment Ring Notch 310. In this position, Containment Ring 702 is allowed to warm up to ambient temperature, increasing in diameter, and seating itself circumferentially into Containment Ring Notch 310. At ambient temperature, due to Containment Ring 702 wanting to return to its greater outside diameter, but being prevented from doing so due to the smaller inside diameter of Containment Ring Notch 310, an interference fit results, with compressive circumferential force being applied to Containment Ring 702 by Fan Case 302, and tensile circumferential force is applied to Fan Case 302 by Containment Ring 702. One skilled in the art will recognize that a combination of heating Fan Case 302 along with cooling Containment Ring 702 may also be employed in certain situations to effect a shrink fit.

In one embodiment of the invention, Containment Ring Notch 310 is machined circumferentially with a reverse taper such that the inside diameter of Fan Case 302 at point A is less than the inside diameter of Fan Case 302 at point B. The taper may vary from fan case to fan case, ranging from just greater than 0° for a cylindrical case to an appropriate degree that would depend upon the specific geometry of a conical fan case. Containment Ring 702 is machined circumferentially on its outside surface to match this same reverse taper. Even though Containment Ring 702 is shrink interference fit onto Fan Case 302, the taper adds extra security so that Containment Ring 702 will not slip axially on Fan Case 302, which could possibly happen if Containment Ring Notch 310 was manufactured without the taper.

In addition, the machining for Fan Case 302 may be done in a first direction, such as radially, and the machining for Containment Ring 702 may be done in a second direction, such as axially, which is more or less perpendicular to the first direction. Since machining leaves a spiral, or record, continuous groove on the machined surfaces, the grooves on each surface will align in a cross-hatch manner to each other, increasing the frictional forces between the two surfaces and reducing the potential for spinning of Containment Ring 702 within Containment Ring Notch 310. The plurality of grooves on Containment Ring 702, which is made of a nickel-base super alloy, are harder than the plurality of grooves on Containment Ring Notch 310 of Fan Case 302, which is made of titanium, or in other fan casings, possibly steel or aluminum. The nickel-base super alloy grooves will dent into the softer titanium, steel, or aluminum grooves. Alternatively, Containment Ring 702 could simply be spot welded in one or more locations to Containment Ring Notch 310, or bolted to one or more flanges secured to Containment Ring Notch 310, to keep Containment Ring 702 from spinning in relation to Containment Ring Notch 310. Machining in cross directions would not be needed in this case.

Figure 4:
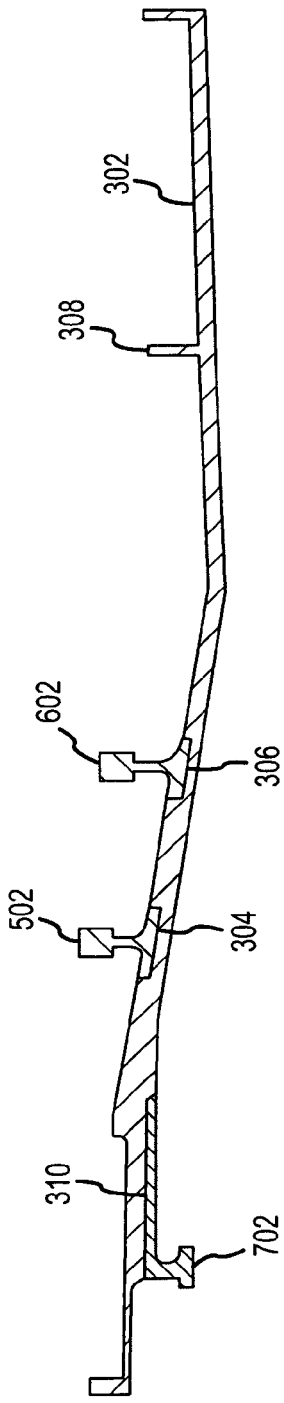
FIG. 4 shows a cross section of a machine finished fan casing having two stiffener rings (FIGS. 5A, 5B and 6A, 6B) and a containment ring (FIGS. 7A, 7B) that have been shrink interference fit to the fan casing of FIG. 3 in an embodiment of the present invention.

FIG. 4 shows a cross section of a machine finished fan casing having two stiffener rings (FIGS. 5A, 5B, 6A, and 6B) and a containment ring (FIGS. 7A and 7B) that have been shrink interference fit to the fan casing of FIG. 3 in an embodiment of the present invention. Referring now to FIG. 4, Containment Ring 702 replicates part of the structure comparable to Second Containment Ring 212, and eliminates the need for First Containment Ring 210 entirely. By shrink interference fitting Containment Ring 702 on the inside diameter of Fan Case 302, as opposed to the outside, the harder super alloy of Containment Ring 702 provides the initial striking surface should a blade break off. The softer titanium, steel, or aluminum, of Fan Case 302 on the outside of Containment Ring 702 acts as a shock absorber due to the different expansion rates between the two materials. As the super alloy of Containment Ring 702 begins to move, it pushes against the titanium, steel, or aluminum of Fan Case 302 with a different coefficient of expansion. This is like having two nets close to each other. The super alloy of Containment Ring 702 takes the initial blow, and some of the force is transferred to the titanium, steel, or aluminum Fan Case 302 like a shock absorber.

First Stiffening Ring 502 and Second Stiffening Ring 602 are shown seated in First Stiffening Ring Notch 304 and Second Stiffening Ring Notch 306 respectfully. First Stiffening Ring 502 and Second Stiffening Ring 602 provide stiffening to prevent Fan Case 302 from deforming out-of-round, or going oval, during operation of the engine under temperature and load conditions.

In this particular example, Table 1 below shows a comparison of the forge and flight weights, and costs, of prior art Fan Case 202 compared to Fan Case 302 of the present invention.

TABLE 1

| Part/Material | Forge Wt. (lbs) | Flight Wt. (lbs) | Cost/ lb | Total Cost |
|---|---|---|---|---|
| Fan Case 202 Titanium | 3,347.0 | 975.2 | $8.00 | $26,776.00 |
| Fan Case 302 Titanium | 2,595.0 | 751.3 | $8.00 | $20,760.00 |
| First Stiffening Ring 502 Aluminum | 154.0 | 40.5 | $1.50 | $ 231.00 |
| Second Stiffening Ring 602 Aluminum | 148.0 | 40.6 | $1.50 | $ 222.00 |
| Containment Ring 702 Inconel 718 | 467.0 | 138.1 | $7.00 | $ 3,269.00 |
| Total | 3,364.0 | 970.5 | $7.28 | $24,482.00 |
| Savings | −17.0 | 4.7 | $0.72 | $ 2,294.00 |

Thus, in this example, though the forge weight is 17 pounds more, the flight weight is 4.7 pounds less. In addition, the average cost per pound of the materials for Fan Case 302 is $0.72 per pound less than that of Fan Case 202, resulting in a total savings of $2,294.00. The biggest advantage, however, is the increased fan case containment strength of Fan Case 302 over Fan Case 202. In this example, Fan Case 302 is considerably stronger than Fan Case 202.

In other applications, the savings could be more significant. For example, for a fan casing that requires Kevlar® reinforcement, a fan casing of the present invention may be sufficiently stronger so as to eliminate the need for the Kevlar® reinforcement, which would be a substantial savings in both materials cost and labor. The present invention could also be used with Kevlar® reinforcement to attain higher fan case containment strength. For gas turbine jet engines that currently use steel or titanium for the fan casings, the present invention may enable aluminum to be substituted for the steel or titanium, and the strength needed for containment provided for by the nickel-base super alloy containment ring. Since the same volume of aluminum or titanium is about 30%-55% of the weight of the same volume of steel, substantial weight savings will result. This weight savings is directly translated into increased cargo carrying capability or reduced fuel costs or a combination of both.

In the gas turbine jet engine industry, the trend is toward making fan blades longer to increase thrust. The tips of the fan blades can rotate at supersonic speeds, while the base of the fan blades rotate at subsonic speeds. This can cause a harmonic vibration in the blades resulting in the tips of the blades breaking off. To counter this problem, instead of making straight fan blades, the blades are shaped more like wide paddles. These wider and longer blades result in more mass that must be contained within the fan casing. Also, as engines become more efficient, they operate at hotter temperatures, adding more difficulty to the containment problem. The present invention can greatly assist in meeting these challenges for greater fan case containment strength and potentially less overall weight and lower cost.

Figure 8:
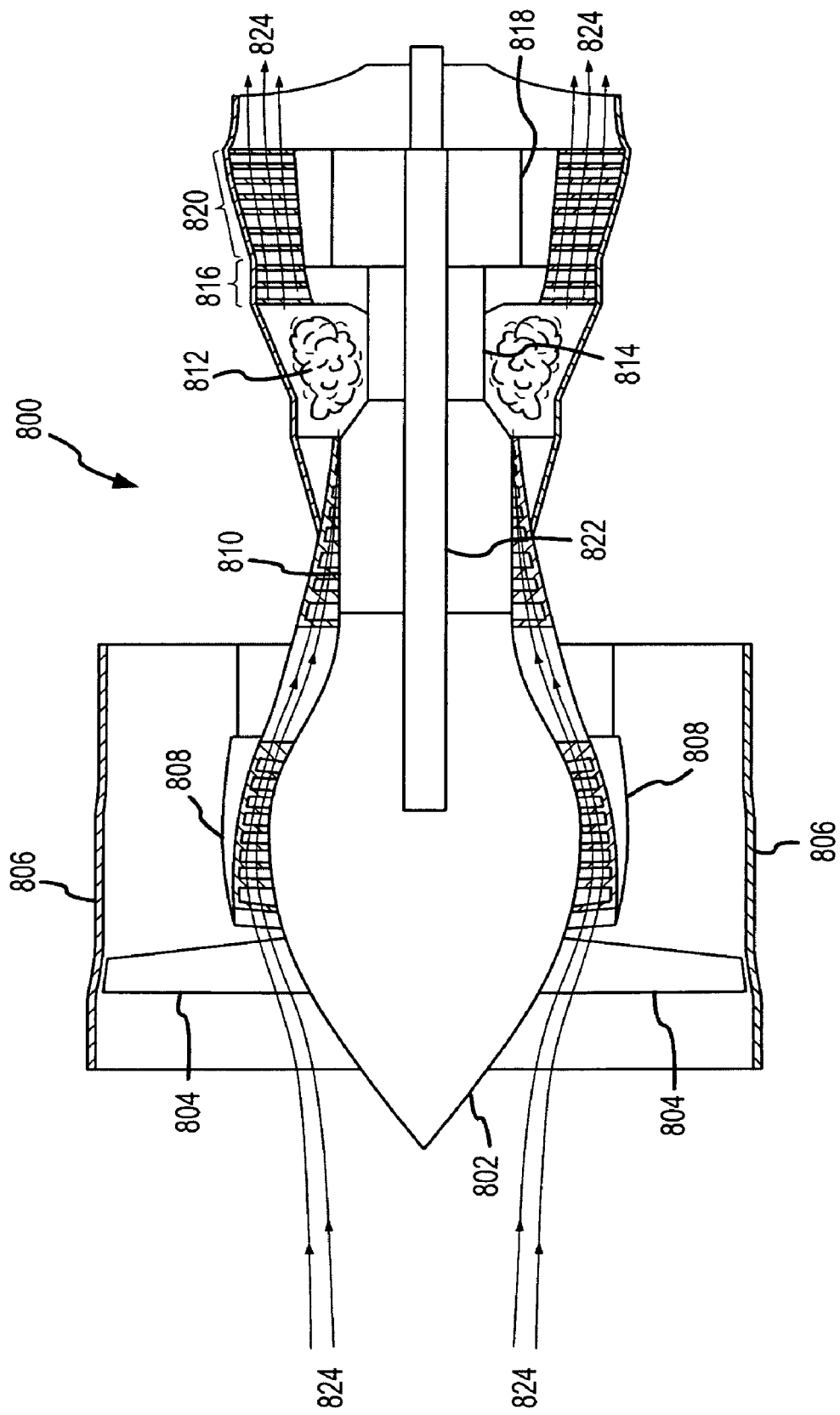
FIG. 8 shows a schematic diagram of the airflow through a typical gas turbine jet engine.

FIG. 8 shows a schematic diagram of the airflow through a typical gas turbine jet engine. Referring now to FIG. 8, for a gas turbine jet engine not susceptible to backfiring, Air Flow 824 flows into Fan Case 806 and into Booster 808. High Pressure Compressor Rotor 810 compress Air Flow 824 as it enters Combustor 812. After passing through the high pressure and low pressure turbines, Air Flow 824 flows out of the back of Gas Turbine Jet Engine 800. The heated Air Flow 824 in Combustor 812 only travels on through and out of the back of Gas Turbine Jet Engine 800.

Figure 9:
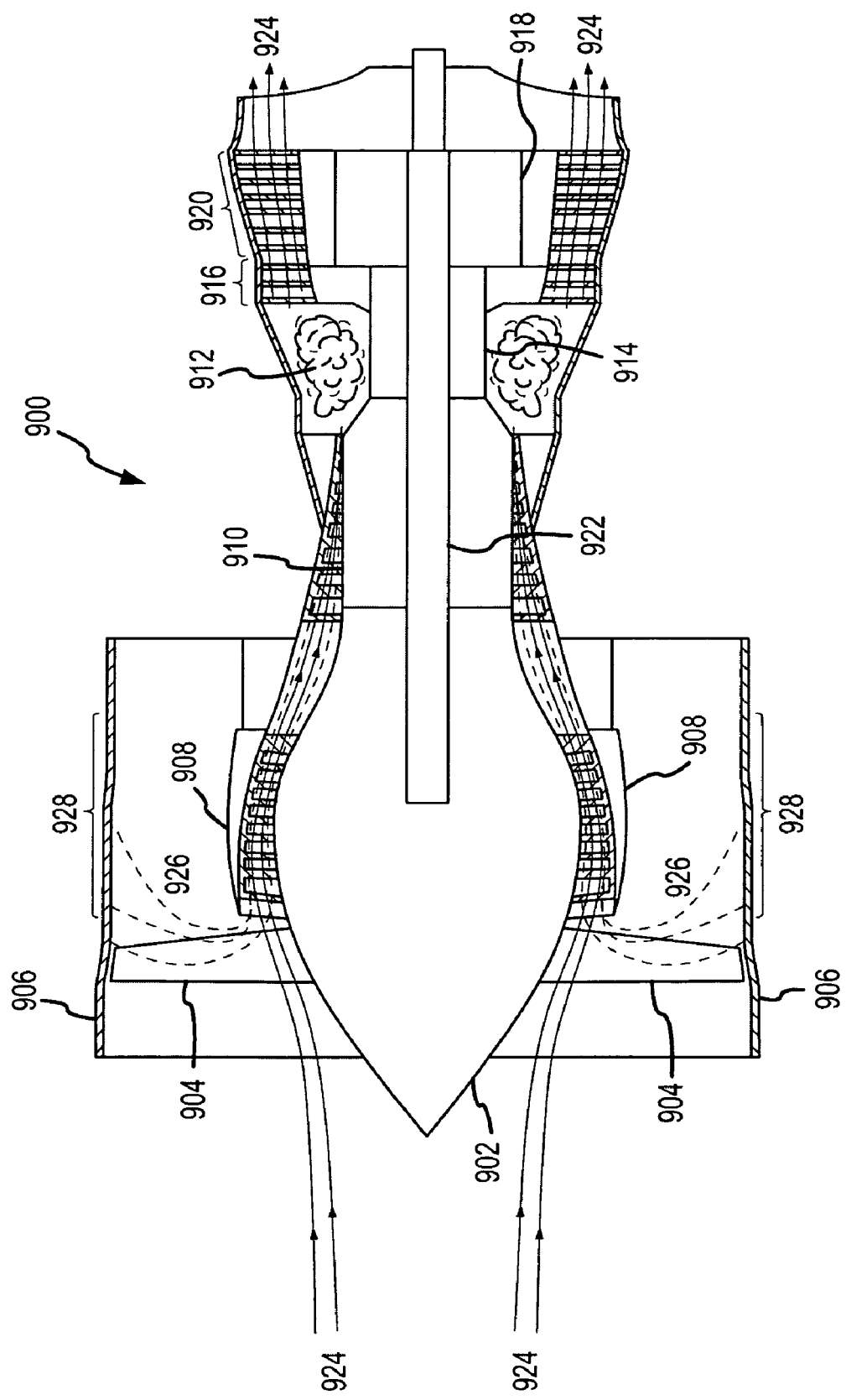
FIG. 9 shows a schematic diagram of the airflow through a typical gas turbine jet engine susceptible to backfiring.

FIG. 9 shows a schematic diagram of the airflow through a typical gas turbine jet engine susceptible to backfiring. Referring now to FIG. 9, in contrast to FIG. 8, Gas Turbine Jet Engine 900 is susceptible to backfiring, which causes a portion of Air Flow 924, Heated Air 926 represented by dotted lines, to flow backwards through Gas Turbine Jet Engine 900 and into the area of Fan 902. Heated Air 926 causes the temperature within Fan Case 906 to rise, which also elevates the temperature of Fan Case 906 itself in the area designated generally by Area 928. Temperature is of course one of the primary factors in determining what material Fan Case 906 must be constructed. When fan case temperatures rise above 800 degrees, aluminum may no longer be suitable. More expensive heat tolerant materials, such as steel, titanium, or super alloys, may be required.

FIG. 10 shows a cross section of a forging for a fan casing for improved heat resistance in an embodiment of the present invention. Referring now to FIG. 10, for gas turbine jet engines susceptible to backfiring, a fan casing of the present invention can be used to counteract the heat problems and improve the heat resistance of Fan Case 1002. Fan Case Forging 1000 is similar to Fan Case Forging 300 shown in FIG. 3. Fan Case Forging 1000 after machining yields Fan Case 1002, shown in dotted line outline, which is similar to Fan Case 302. In this example, Fan Case Forging 1000 is forged from aluminum in one piece.

Structural features of the machined Fan Case 1002 are similar to that shown in FIGS. 3 and 4 but also includes Heat Resistance Ring Notch 1012 which circles the inside of Fan Case 1002 circumferentially at the location defined generally by Area 928 in FIG. 9. A ring of heat resistant material will, with a shrink interference fit, be seated in Heat Resistance Ring Notch 1012. The section of Fan Case 1002 spanning Heat Resistance Ring Notch 1012 is the region where the heated air from backfiring causes increased fan case temperatures.

As described above, the machining for Fan Case 1002 may be done in a first direction, such as radially, and the machining for Heat Resistance Ring 1112 may be done in a second direction, such as axially, which is more or less perpendicular to the first direction. Since machining leaves a spiral, or record, continuous groove on the machined surfaces, the grooves on each surface will align in a cross-hatch manner to each other, increasing the frictional forces between the two surfaces and reducing the potential for spinning of Heat Resistance Ring 1112 within Heat Resistance Ring Notch 1012. The plurality of grooves on Heat Resistance Ring 1112, which is made of titanium, are harder than the plurality of grooves on Heat Resistance Ring Notch 1012 of Fan Case 1002, which is made of aluminum. The titanium grooves will dent into the softer aluminum grooves. Alternatively, Heat Resistance Ring 1112 could simply be spot welded in one or more locations to Heat Resistance Ring Notch 1012, or bolted to one or more flanges secured to Heat Resistance Ring Notch 1012, to keep Heat Resistance Ring 1112 from spinning in relation to Heat Resistance Ring Notch 1012. Machining in cross directions would not be needed in this case.

FIG. 11 shows a cross section of a machine finished fan casing having a ring of heat resistant material that has been shrink interference fit to the fan casing of FIG. 10 in an embodiment of the present invention. Referring now to FIG. 11, Heat Resistance Ring 1112 is shown shrink interference fit on the inside diameter of Fan Case 1002 in Heat Resistance Ring Notch 1012. In this example, Heat Resistance Ring 1112 is made of titanium, but may also be made of other materials that have a combination of heat resistant properties and strength properties to maintain the structural integrity required for Fan Case 1002 such as steel, steel alloy, or any number of commonly used aerospace super alloys. Heat Resistance Ring 1112 may be fabricated from titanium sheet material that is cut, bent into a cylindrical shape, welded along the seam, and formed to match the inside diameter of Heat Resistance Ring Notch 1012. Heat Resistance Ring 1112 may also be forged as described above.

The shrink with interference fit may be accomplished, as described above, by heating Fan Case 1002, causing it to expand in diameter and allowing Heat Resistance Ring 1112 to be slid into place, where upon cooling, Fan Case 1002 and Heat Resistance Ring 1112 apply force to each other in a shrink interference fit. Alternatively, Heat Resistance Ring 1112 may be cooled with liquid nitrogen, reducing its outside diameter and enabling Heat Resistance Ring 1112 to be slid into Heat Resistance Ring Notch 1012. Also, a combination of heating Fan Case 1002 and cooling Heat Resistance Ring 1112 may be employed to secure the shrink interference fit. The titanium of Heat Resistance Ring 1112 is not weakened structurally by the fan case temperatures, and serves as a buffer to the aluminum Fan Case 1002 due to the different expansion rates between the two materials. The titanium of Heat Resistance Ring 1112 is exposed to internal fan case temperatures, and some of the heat is transferred to the aluminum Fan Case 1102. The titanium provides the strength needed that the aluminum lacks at the higher temperatures. Containment Ring 1102 may be made from a super alloy.

First Stiffening Ring Notch 1104 and Second Stiffening Ring Notch 1106 may be made of aluminum, titanium, or steel. Depending upon the specific gas turbine jet engine being considered, a containment ring and one or more stiffening rings may not be necessary with a heat resistance ring, and a heat resistance ring may not be necessary with a containment ring and one or more stiffening rings. The present invention gives the engine designer many options regarding materials, weights, strengths, and heat resistance that can be combined to come up with an optimum design for a specific engine's goals and requirements.

Having described the present invention, it will be understood by those skilled in the art that many changes in construction and widely differing embodiments and applications of the invention will suggest themselves without departing from the scope of the present invention.

What is claimed is:

1. A method for improving fan case containment in a gas turbine jet engine, the method comprising:
    (a) machining a containment ring notch circumferentially into an inner surface towards a front end of the fan case in a vicinity of a rotating fan;
    (b) seating a closed, solid, metal containment ring in said containment ring notch through a shrink interference fit, facing surfaces of the ring and containment ring notch forming complementary shapes, wherein said metal is a nickel-based super alloy having different thermal expansion properties than the fan case; and
    (c) strengthening the fan case against fan blade loss via the shrink interference fit.

2. A method according to claim 1 wherein said machining further comprises:
    machining said containment ring notch into said inner surface of the fan case in a first direction, wherein a plurality of grooves are formed and aligned on said inner surface in said first direction.

3. A method according to claim 2 further comprising:
    forging said containment ring in one piece; and
    machining said containment ring to a predetermined shape to match with said containment ring notch.

4. A method according to claim 3 wherein said containment ring is forged from nickel-base super alloy in one piece.

5. A method according to claim 3 further comprising:
    spot welding said containment ring to said containment ring notch in at least one location to prevent said containment ring from spinning in relation to said containment ring notch.

6. A method according to claim 3 further comprising:
    bolting said containment ring to at least one flange secured to said containment ring notch to prevent said containment ring from spinning in relation to said containment ring notch.

7. A method according to claim 3 wherein said machining said containment ring further comprises:
    machining said containment ring with a reverse taper, wherein a first outside diameter of said containment ring at a first point towards a front end is less than a second inside diameter of said containment ring at a second point away from said front end.

8. A method according to claim 1 wherein said machining further comprises:
    machining said containment ring notch with a reverse taper, wherein a first inside diameter of the fan case at a first point of said containment ring notch towards said front end is less than a second inside diameter of the fan case at a second point of said containment ring notch located away from said front end.

9. A method according to claim 1 wherein said seating further comprises:
    heating the fan case to cause an inside diameter of said containment ring notch to increase to a second diameter that is larger than an outside diameter of said containment ring at an ambient temperature;
    positioning said containment ring in said containment ring notch; and
    allowing the fan case to cool to said ambient temperature, causing said containment ring notch to want to decrease from said second diameter to said inside diameter, but prevented from doing so by said outside diameter of said containment ring at said ambient temperature, giving rise to said shrink interference fit.

10. A method according to claim 1 wherein said seating further comprises:
    heating the fan case to cause an inside diameter of said containment ring notch to increase to a second diameter;
    cooling said containment ring to cause an outside diameter of said containment ring to decrease to a second diameter, wherein said second diameter of said containment ring is smaller than said second diameter of said containment ring notch;
    positioning said containment ring in said containment ring notch; and
    allowing the fan case to cool to an ambient temperature causing said containment ring notch to want to decrease from said second diameter to said inside diameter, and allowing said containment ring to warm up to said ambient temperature causing said containment ring to want to increase to said outside diameter, giving rise to said shrink interference fit.

11. A method according to claim 1 wherein said seating further comprises:
    cooling said containment ring to cause an outside diameter of said containment ring to decrease to a second diameter, wherein said second diameter of said containment ring is smaller than an inside diameter of said containment ring notch;
    positioning said containment ring in said containment ring notch; and
    allowing said containment ring to warm up to said ambient temperature causing said containment ring to increase toward said outside diameter, but prevented from expanding to said outside diameter by said inside diameter of said containment ring notch at said ambient temperature, giving rise to said shrink interference fit.

12. A method for improving fan case containment in a gas turbine jet engine, the method comprising:
    forging a containment ring in one piece;
    machining a containment ring notch circumferentially into an inner surface towards a front end of the fan case, said machining including machining said containment ring notch into said inner surface of the fan case in a first direction, wherein a plurality of grooves are formed and aligned on said inner surface in said first direction;
    machining said containment ring to a predetermined shape to match with said containment ring notch; and
    seating said containment ring in said containment ring notch through a shrink interference fit;
    wherein said machining said containment ring further comprises:

machining an outer surface of said containment ring in a second direction, wherein a plurality of grooves are formed and aligned on said outer surface in said second direction;

wherein when said inner surface of said containment ring notch and said outer surface of said containment ring are seated together, said plurality of grooves on said inner surface of said containment ring notch and said plurality of grooves on said outer surface of said containment ring align in a cross-hatch manner to each other, increasing the frictional forces between said containment ring notch and said containment ring and reducing the potential for spinning of said containment ring within said containment ring notch.

13. A method for improving fan case containment in a gas turbine jet engine, the method comprising:

machining a containment ring notch circumferentially into an inner surface towards a front end of the fan case in a vicinity of a rotating fan;

seating a closed, solid, metal containment ring in said containment ring notch through a shrink interference fit, facing surfaces of the ring and containment ring notch forming complementary shapes, wherein said metal is a nickel-based super alloy having different thermal expansion properties than the fan case;

strengthening the fan case against fan blade loss via the shrink interference fit;

machining at least one stiffening ring notch circumferentially into an outer surface of the fan case; and seating a stiffening ring in said at least one stiffening ring notch, wherein said stiffening ring helps prevent the fan case from going oval under a load and temperature conditions experienced during operation of the gas turbine jet engine.

14. A method for improving fan case containment in a gas turbine jet engine, the method comprising:

machining a containment ring notch circumferentially into an inner surface towards a front end of the fan case;

seating a containment ring in said containment ring notch through a shrink interference fit;

machining at least one stiffening ring notch circumferentially into an outer surface of the fan case; and seating a stiffening ring in said at least one stiffening ring notch, wherein said stiffening ring helps prevent the fan case from going oval under a load and temperature conditions experienced during operation of the gas turbine jet engine wherein seating said stiffener ring further comprises:

heating said stiffening ring to cause a first inside diameter of said stiffening ring to increase to a second inside diameter that is larger than an outside diameter of said at least one stiffening ring notch at an ambient temperature;

positioning said stiffening ring in said at least one stiffening ring notch; and allowing said stiffening ring to cool to said ambient temperature, causing said stiffening ring to decrease from said second inside diameter toward said first inside diameter, but prevented from shrinking to said first inside diameter by said outside diameter of said at least one stiffening ring notch, giving rise to said shrink interference fit.

* * * * *